US006605261B2

(12) United States Patent
Bertolotti

(10) Patent No.: US 6,605,261 B2
(45) Date of Patent: Aug. 12, 2003

(54) METHOD AND APPARATUS FOR CONTINUOUSLY TRANSFORMING PLUTONIUM OXALATE INTO PLUTONIUM OXIDE

(75) Inventor: Gérard Bertolotti, Montreuil (FR)

(73) Assignee: Compagnie Generale des Matieres Nucleaires, Velizy Villacoublay (FR)

( * ) Notice: Subject to any disclaimer, the term of this patent is extended or adjusted under 35 U.S.C. 154(b) by 0 days.

(21) Appl. No.: 09/748,340

(22) Filed: Dec. 22, 2000

(65) Prior Publication Data

US 2002/0004025 A1 Jan. 10, 2002

(30) Foreign Application Priority Data

Jan. 3, 2000 (FR) ............................................. 00 00014

(51) Int. Cl.[7] .............................. F27B 9/00; B01F 7/02; B01J 8/10; G21F 9/28
(52) U.S. Cl. ...................... 422/198; 422/159; 422/190; 422/224; 422/229; 422/233; 422/903
(58) Field of Search .................................. 422/159, 903, 422/184.1, 174, 199, 198, 202, 207, 229, 225, 177, 211, 212; 588/1, 18–19, 900; 432/152, 154, 251, 112, 114; 423/16; 110/237

(56) References Cited

U.S. PATENT DOCUMENTS

| 1,820,668 A | * | 8/1931 | Lobley ........................ 373/115 |
| 2,868,620 A | | 1/1959 | Garner ........................ 423/251 |
| 3,757,497 A | * | 9/1973 | Ray ............................. 137/613 |
| 3,871,829 A | * | 3/1975 | Keith et al. .................. 252/636 |
| 3,883,331 A | * | 5/1975 | Bernard et al. ................ 55/381 |
| 3,986,821 A | * | 10/1976 | MacNitt, Jr. ................. 432/112 |
| 4,112,055 A | * | 9/1978 | Artaud ........................ 423/253 |
| 4,298,579 A | | 11/1981 | Kuhn et al. ..................... 423/11 |
| 4,734,998 A | * | 4/1988 | Lee et al. ..................... 210/770 |
| 4,830,841 A | * | 5/1989 | Urza ............................ 252/643 |
| 5,551,870 A | * | 9/1996 | Gale ............................. 34/108 |
| 5,607,648 A | * | 3/1997 | Carter et al. ................. 422/137 |
| 2001/0054581 A1 | * | 12/2001 | Bertolotti et al. ........... 210/394 |

FOREIGN PATENT DOCUMENTS

| GB | 1224248 A | * | 3/1971 | ........... C01G/56/00 |
| JP | 7094337 | | 6/1982 | ............ B01J/19/08 |

OTHER PUBLICATIONS

Geankoplis, Christie J. Transport Processes and Unit Operations. 1993. 3rd Edition. pp. 807–810.*
Database Chemabs, Chemical Absracts Service, Columbus, Ohio, *The FLASHCAL process for the fabrication of fuel–metal oxides using the Whiteshell Roto–Spray Calciner*, Sridhar, T. Sampat STN database access No. 108:120695 CA XP002147412 No Date.
Preliminary Search Report and Annex, 2 pgs., dated Sep. 14, 2000.

* cited by examiner

*Primary Examiner*—Hien Tran
*Assistant Examiner*—Jennifer Leung
(74) *Attorney, Agent, or Firm*—Cohen, Pontani, Lieberman & Pavane

(57) ABSTRACT

The present invention relates to a method of transforming plutonium oxalate into plutonium oxide by drying and then calcining. In said method, in a characteristic manner, the operations of drying and calcining are implemented continuously, in the presence of oxygen and with gas extraction, in two adjacent zones of a single apparatus, e.g. of the screw oven type, that is maintained at negative pressure. The present invention also provides apparatus suitable for implementing said method.

10 Claims, 1 Drawing Sheet

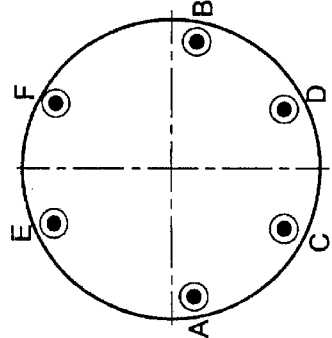
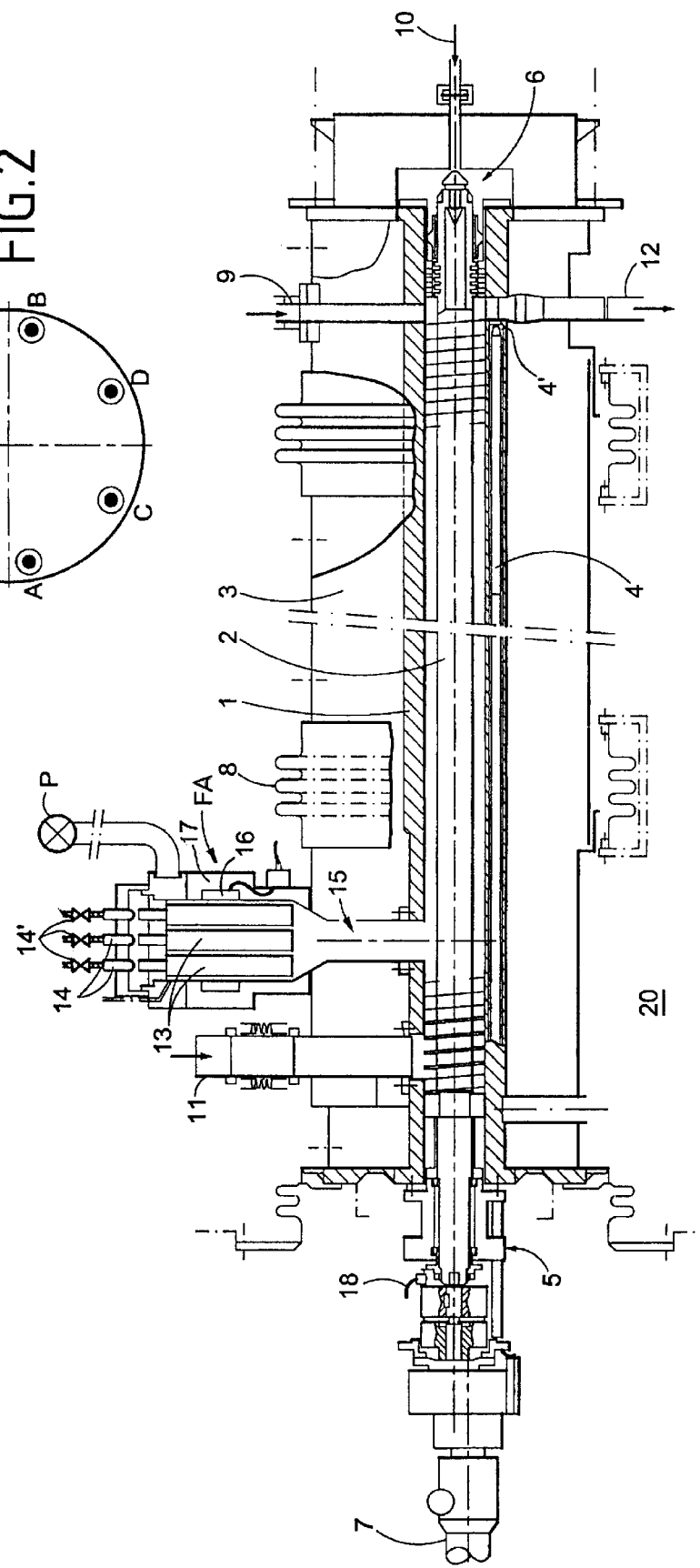

METHOD AND APPARATUS FOR CONTINUOUSLY TRANSFORMING PLUTONIUM OXALATE INTO PLUTONIUM OXIDE

The present invention relates to a method and apparatus for continuously transforming plutonium oxalate into plutonium oxide. More precisely, the invention relates to a method and to an apparatus suitable for continuously transforming plutonium oxalate into plutonium oxide by drying and then calcining said oxalate, in the presence of oxygen.

BACKGROUND OF THE INVENTION

The invention lies in the general context of recovering plutonium. Such recovery of plutonium, starting from purified plutonium nitrate solutions themselves coming from extraction cycles, conventionally comprises four steps:

- the plutonium is precipitated from said solutions in oxalate form;
- the resulting precipitate is recovered by filtering and is then drained;
- it is dried and then calcined; and
- it is finally homogenized.

The plutonium oxide powder obtained in this way is then packaged in compliance with the safety rules in force so as to protect man and the environment.

The operations of drying and calcining the drained plutonium oxalate (said drained plutonium oxalate generally still containing about 30% by weight water, bonded water+ interstitial water) are performed discontinuously (in batches) in the prior art in distinct pieces of equipment, always under double containment for obvious safety reasons. Conventional ovens housed in glove boxes are used in succession and completely independently of each other: the first for drying said drained plutonium oxalate and the second for calcining the dried oxalate in the presence of oxygen.

OBJECTS AND SUMMARY OF THE INVENTION

The Applicant now proposes an improvement to that technique of transforming plutonium oxalate into plutonium oxide by drying and then calcining. It proposes implementing said transformation continuously, in a single apparatus.

In a first aspect, the present invention thus provides a method of transforming plutonium oxalate into plutonium oxide by drying and then calcining. In characteristic manner, in the context of said method., said operations of drying and calcining are implemented continuously in the presence of oxygen and with gas extraction in two adjacent zones of a single apparatus maintained at negative pressure (the said—negative—pressure is the relative pressure with regard to the ambient pressure).

In the invention, a single device is used, e.g. of the screw oven or conveyor oven type, that is maintained at negative pressure (for containment problems) in order to treat plutonium oxalate continuously both to dry and to calcine continuously said plutonium oxalate. The single apparatus is advantageously of the screw oven type as described in general terms below in the present specification and in more detailed manner, likewise below in the present specification, with reference to the accompanying figures. For reasons of double containment, said single apparatus is normally disposed in a glove box.

Within said single apparatus, the treated oxalate precipitate progresses continuously from a first zone in which it is dried towards a second zone in which it is calcined. Oxygen is used within said single apparatus to transform said oxalate precipitate into oxide.

The drying and calcining of said precipitated oxalate generates gas continuously, in particular water vapor and carbon dioxide. Said gas must be extracted specifically to ensure that the single apparatus within which the method is implemented is maintained at negative pressure.

The gas is advantageously extracted under conditions optimized so that gas extraction has minimal impact on the drying and calcining process. In particular, the amount of powder entrained is minimized as is any remoistening of dried powder by the water that is generated during drying. For this purpose, said gas extraction is advantageously implemented in the drying zone of the sole apparatus within which the method is implemented. It is preferably implemented in said zone as far upstream as possible (although it must clearly be implemented downstream from the zone where the load to be treated is introduced).

In the context of the invention, as in the prior art, the extracted gas is charged with radioactive dust. Prior to being evacuated, said gas must therefore necessarily be dedusted. For this purpose, it is possible to use prior art techniques, and in particular:

- said gases can be treated in a condenser-washer; and/or
- they can be caused to pass through a filter element.

Such a filter element is placed on the gas extraction circuit. As a general rule n parallel-connected elements of this type are used. Conventionally, such an element is constituted by a filter medium disposed in a support and referred to as a filtering cartridge. Whatever the context of use, once the filter medium has become clogged, such a cartridge is no longer effective. In ordinary use, such cartridges need to be changed regularly. Clogging means that they should be replaced systematically, which requires the gas filtering process in question to be interrupted.

When implementing the method of the invention, the extracted gas (advantageously extracted from the drying zone) is advantageously cleaned of radioactive dust by being filtered through at least one filtering cartridge.

In the context of the present invention, it is recommended to implement said filtering under the particularly advantageous conditions of implementing said filtering without interruption and with in situ regeneration of the clogged filter medium. The method of the invention is thus advantageously implemented with the extracted gas being filtered through at least one filtering cartridge that contains a non-deformable filter medium; said filter medium is unclogged intermittently, in situ, without interrupting the filtering. Such unclogging is made possible by the filter medium in question being undeformable. To unclog the medium, it is recommended to puff a small pulse of gas in the reverse direction (relative to the filtered gas) through the filter medium in question.

Said quantity of puffed gas is clearly limited. Under no circumstances is a genuine back-flow generated; that would imply introducing a non-negligible quantity of gas into the apparatus, raising the pressure within said apparatus (which it is recalled must necessarily be at negative pressure), and could even cause dust to be blown upstream therefrom. Said quantity of gas is advantageously strictly limited to the quantity required for obtaining the desired pulse effect, which pulse effect is suitable for obtaining the intended unclogging.

Since the atmosphere of the apparatus is thus not disturbed (even for a brief interval), filtering can be carried out without interruption. Clearly, the greater the overall volume of the apparatus, the greater the pulse of gas that can be admitted. Similarly, it is appropriate to increase the number of filtering cartridges used in apparatus of small volume. Regenerating such cartridges one by one then requires only very small quantities of gas in each puff.

The looked-for pulse effect is optimized if the small pulse of gas is puffed only when a genuine layer or "cake" of dust has formed on the filter medium to be regenerated. Under such optimum conditions of implementation—i.e. when there is a layer of dust of perceptible thickness on the filter medium—the pulse of gas is subjected to maximum pressure drop and is certain not to generate any back-flow within the apparatus. In a preferred variant implementation of the unclogging method, it is therefore strongly recommended to puff a small pulse of gas only once a layer of dust has formed on the filter medium. If the gas is puffed in prematurely, two undesirable phenomena can be observed:

the filter medium in question becomes reclogged very quickly; and a back-flow is observed within the apparatus; the puffed gas has not been subjected to sufficient pressure drop.

The person skilled in the art knows how to minimize and even avoid these undesirable phenomena; and in any event knows how to determine the minimum or optimum thickness of cake for obtaining best results, given the various parameters in question (the internal volume of the filter medium to be regenerated, the total volume of the apparatus).

It is recalled at this point that filter media that can be unclogged in situ are undeformable. It is therefore clear that said filter media are unclogged in the invention without deforming them or vibrating them (advantageously by breaking off the genuine cake that has formed on them).

Such undeformable filter media are familiar to the person skilled in the art. They can be constituted in particular by filter media made of sintered metal, of woven metal, or of ceramics.

The small pulse of gas is advantageously blown by means of a nozzle, advantageously a nozzle having a sonic throat. The profile of such a nozzle should be optimized to obtain the looked-for pulse effect. Such optimization is within the competence of the person skilled in the art.

The gas thus puffed into the gas extraction zone must clearly avoid disturbing the on-going drying and calcining process, whether in terms of quantity (see above) and/or in terms of kind. In particular, it is recommended to puff air or an inert gas, and in particular to puff air. Unclogging can thus be performed at lower cost, without significantly affecting the oxidizing atmosphere of the apparatus.

In the light of the above, the person skilled in the art can see the advantage of the present invention. The treatment (drying+calcining) of the (moist) plutonium oxalate is performed continuously within a single apparatus and is therefore much more efficient than the same treatment as implemented in the prior art as two distinct stages (drying, calcining), each being implemented within a different piece of apparatus.

In its second aspect, the invention provides apparatus suitable for implementing the above-described method. Within said single apparatus, the oxalate precipitate is successively dried and then calcined.

The apparatus as described below is particularly preferred.

It is mentioned at this point that the method of the invention is entirely suitable for being implemented in apparatuses that are somewhat different.

The particularly preferred apparatus comprises:

an oven of generally cylindrical shape fitted on its horizontal longitudinal axis with an Archimedes' type screw, said screw on rotating being suitable for transferring heat-treated substance from a first zone of said oven where it is dried to a second zone where it is calcined; the body of said oven presenting firstly, suitable openings for:

feeding the oven with plutonium oxalate at one of its ends, adjacent to the first zone;

emptying plutonium oxide from the oven at its other end, adjacent to the second zone;

injecting oxygen into said oven; and extracting gas from said oven;

and presenting secondly, in its thickness, housings for receiving heater elements; said elements being suitable for being regulated to define temperature conditions inside said oven that are suitable for implementing drying in said first zone and calcining in said second zone;

gas extraction means suitable for extracting gas from said oven, while keeping the oven at negative pressure; said means acting downstream from the gas extraction opening formed in the body of said oven; and advantageously removal means suitable for removing entrained dust from said gas extracted through said extraction opening by said gas extraction means; said removal means advantageously being constituted by a filter assembly.

The heater elements for positioning in the thickness of the body of said oven (in housings provided for this purpose) are, in a preferred variant, essentially constituted by heater rods of appropriate length. Said heater rods for positioning longitudinally relative to the axis of the oven are advantageously associated with means for regulating the heating power they evolve, e.g. thermocouples.

In a particularly preferred variant, two types of such heater rod are used in the body of the oven (in housings provided for this purpose):

at least one "short" rod which is responsible for part of the drying of the plutonium oxalate in the first zone of the oven; and at least one "long" rod which is responsible both for the remaining portion of the drying of the plutonium oxalate in said first zone of the oven (in addition to said short rod(s)) and for calcining said plutonium oxalate in the second zone of the oven.

It is mentioned above that gas extraction advantageously takes place in the drying zone. Thus, the gas extraction opening is advantageously provided in the drying zone (first zone of the oven), naturally downstream from the opening for feeding the oven with plutonium oxalate.

The means for removing entrained dust from the extracted gas can consist in particular in a condenser-washer and/or a filter assembly. Said means are advantageously constituted by a filter assembly. Such a filter assembly generally comprises at least one filtering cartridge, and advantageously a set of n filtering cartridges connected in parallel.

Advantageously, in order to implement unclogging in situ, as described above, use is made of a one or more filtering cartridges containing undeformable filter medium and each of said cartridges is associated with means for unclogging its filter medium in situ.

Said unclogging means generally comprise a nozzle suitable for intermittently passing a small pulse of gas into the clogged filter medium.

The pulse effect is advantageously obtained by feeding said nozzle with said gas under the control of a fast opening/closing solenoid valve.

The gas used for unclogging can be taken from an appropriate network. It can also be taken from a supply or tank provided for this purpose, in which case after being inserted into said tank, the gas is stored therein under pressure. Said tank is naturally suitable for being isolated by stop cocks. In such a tank, the gas pressure is adjusted by means of a pressure-reducing valve. Downstream from the tank, the gas can be injected into the filter medium that is to be regenerated. Injection is performed by means of the nozzle whose profile and position in the system are advantageously optimized. The flow speed achieved in the constricted portion of said nozzle can be sonic. Puffing is advantageously under the control of a solenoid valve.

The mass flow rate of the gas puffed during a pulse can thus be fully controlled.

In characteristic manner, a single oven is used in the apparatus of the invention, within which oven (drained) plutonium oxalate is successively dried and then calcined.

Said single oven presents the four openings listed above. Advantageously, the said four openings are arranged as follows:

the oxalate feed opening is arranged in the top portion of the oven body;

the gas extraction opening is likewise arranged in the top portion of the oven body, downstream from said feed opening. As mentioned above, it is advantageous for said extraction opening to be close to said feed opening;

the emptying opening is arranged in the bottom portion of the body of said oven; and the oxygen injection opening is arranged in the top portion of the body of said oven, advantageously on the same axis as said emptying opening; and naturally the feed opening and the gas extraction opening are in the first zone for drying, while the emptying opening and the oxygen injection opening are in the second zone for calcining.

It will readily be understood that in order to maximize the residence time of the powder in an oven of given length, in order to maximize the time during which said powder is in contact with the oxygen, the oxygen injection opening and the emptying opening are positioned as far away as possible from the feed opening and the gas extraction opening.

The structure of said oven is advantageously as described below. The body of said oven is closed in leakproof manner by a front bearing (feed end) and by a rear bearing (emptying end), with the Archimedes' type screw being engaged between said two bearings. The drive device (motor) for said screw is arranged upstream of said front bearing and is advantageously coupled for safety reasons to an assembly for detecting that said screw is indeed rotating. At the rear bearing, provision is made for it to be possible to inject a sweeping gas. The use of such a gas—air or inert gas such as nitrogen, as a general rule—can be advantageous. In any event, said gas cools said rear bearing and reinforces containment.

The oven body—the main structural element of the apparatus of the invention which contains the heater elements—is advantageously lagged in a thermal insulation assembly. Said assembly is advantageously protected by a case fitted with bellows to compensate for expansion. Said case is of a shape that matches that of the oven. It is therefore generally cylindrical in shape.

It is recalled at this point that for reasons of double containment, the apparatus of the invention is generally implemented inside a glove box. In such a context, the housings provided in the body of the oven for the heater elements are advantageously open to the outside of said glove box so that said heater elements are accessible from outside said glove box. It will then be understood that the front face of said oven body advantageously constitutes a portion of the front face of said glove box.

BRIEF DESCRIPTION OF THE DRAWINGS

An advantageous variant of the apparatus of the invention is described below with reference to accompanying FIG. 1.

FIG. 1 is a diagrammatic longitudinal section showing apparatus constituting said advantageous variant of the invention.

FIG. 2 is a diagram showing the positions and the types of heating rods used.

MORE DETAILED DESCRIPTION

As shown diagrammatically in FIG. 1, the apparatus of the invention comprises:

an oven body 1 that is generally cylindrical in shape, comprising an opening 11 at one of its ends, in the top portion thereof, enabling it to be fed with plutonium oxalate, and an opening 12 at the other end of said oven body, in the bottom portion thereof, enabling it to be emptied. A third opening 9 is provided in the top portion on the same axis as the emptying opening 12 for injecting oxygen. A fourth opening 15 is provided to enable gas to be extracted from said oven body 1;

an Archimedes' type screw 2 placed inside said oven body 1 and engaged in a rigid front bearing 5 at the inlet end. Said screw 2 is rotated by a motor and gear box unit 7 associated with a torque meter and a ball torque limiter mounted at the end of the bearing 5. An assembly 18 for detecting rotation makes it possible to verify that said screw 2 is turning. For obvious reasons of ease of maintenance, the system for driving said screw 2 is located outside the glove box 20 in which the apparatus of the invention as a whole is disposed. The bearing 5 is isolated from the atmosphere inside the oven by an axial leakproof graphite/metal sealing gasket. Said front bearing 5 and said screw 2 can need changing during the lifetime of the oven and are therefore removable;

a rear bearing 6 constituted by a graphite ring enabling said screw 2 to rotate in said oven body 1. Said rear bearing 6 enables sweeping air 10 to be injected into said oven body 1. Said sweeping air cools said rear bearing 6. Containment between said oven and the glove box 20 in which it is disposed is obtained dynamically by means of said sweeping air;

a set of heater rods 4 (Joule effect heaters), seated in housings 4' and fitted with respective thermocouples (to regulate said heating), and comprising at least one long rod for both drying and calcining, and at least one short rod for drying only. The positioning and the temperatures of said heater rods are important, since they determine the temperature profile inside the oven 1 and thus determine the quality of the final oxide. One possible disposition of such rods 4 is shown in FIG. 2. References A and B designate two drying and calcining rods, while references C, D, E, and F designate four drying rods. The heating and regulating elements may need changing during the lifetime of the oven so they are removable. They are inserted from the front face of the glove box 20 in which the apparatus of the invention is located. They can thus be replaced without contamination:

a thermal insulation assembly 3 around said oven body 1. The thermal insulation is protected by a cylindrical case fitted with expansion-compensating bellows 8. The essential need for access to the rear bearing 6 means that said thermal insulation 3 must be easily removed from the glove holes in the glove box 20; and a gas filtering assembly FA made up of sintered stainless steel cartridges 13 and means 14 for unclogging said cartridges 13 including a fast opening/closing solenoid valve 14'. Gas is extracted under the action of means P from the drying portion of the oven (first zone) by passing through a fourth opening or tunnel 15. Extraction is performed under conditions which minimize entrainment of powder. Said filter assembly FA is heated by a heating collar 16 so as to avoid any condensation in the filtering cartridges 13. Said filter assembly FA is surrounded by thermal insulation 17. The cartridges 13 which might need to be replaced are easily removable.

Drained oxalate, generally coming from a rotary filter, falls under gravity via 11 into the top end of the oven body 1 and it leaves the oven body in the form of plutonium oxide from the bottom of the other end at 12. The substance is transferred horizontally by the Archimedes' screw 2 which turns continuously inside said oven body 1. Throughout its transfer, the temperature of the substance is raised.

The heating and regulating elements 4 (resistances or set of heater rods 4 and thermocouples not shown) are housed in the thickness of the oven body 1.

The gas generated by drying and calcining the oxalate, the excess oxygen, and the sweeping air are entrained by the means P towards the filter assembly FA which includes the filter cartridges 13. The entrained powder is retained in the filter media of said cartridges 13. Said filter media are unclogged in situ by the unclogging means 14.

In situ unclogging is performed by sequentially delivering a very small quantity of air at the speed of sound into each of the cartridges 13, the air being taken from a supply under pressure. The installation as a whole naturally remains at negative pressure (at a pressure below the ambient pressure). The caked powder falls directly into the oven. This original unclogging can be referred to as being performed by a "bang" effect.

In order to leave the oven free to expand when raised in temperature, said oven body 1 rests via cradles fitted with wheels on rails that are secured to the glove box at the substance inlet end, and a bellows flange connects the front face of the glove box to the front face of said oven body. Said flange guarantees continuity of containment. These means—cradles, rails, bellows flanges—are not shown in FIG. 1.

The oven is controlled from a remote control station.

The equipment is naturally dimensioned to be sub-critical.

The oven must not be capable of being expelled and it must remain sealed and it must retain its geometrical characteristics even after an earthquake.

The invention is illustrated by the following example.

The method of the invention has been implemented in apparatus of the invention of the kind shown diagrammatically in FIG. 1.

The oven was fitted with an Archimedes' type screw. The length of said oven was limited for mechanical reasons associated with the span between the bearings. Its length was about 2 meters (m). The length of the screw was 1700 mm. It was rotated in a cylindrical volume (the inside volume of the oven) whose diameter was 162 mm.

Said oven was used under the following conditions:
when maximally full:
at 60% (ratio of volume occupied by the powder over total volume available in the oven), in the drying zone; and
to a depth of 16 mm in the calcining zone; said drying zone corresponding to the first third of the length of the oven, and said calcining zone corresponded to the last two-thirds of said length;

for a minimum powder transit time of 45 minutes: 15 minutes in the drying zone, and 30 minutes in the calcining zone. The speed of rotation of the screw (said screw being capable of turning at a speed lying in the range 0 to 5 revolutions per minute (rpm)) was in any event regulated so that the depth of 16 mm of oxide in the calcining zone was never exceeded; and with heating rods (four drying rods, and two drying and calcining rods) positioned as shown in FIG. 2. Each of said drying rods had a total length of 650 mm, and more precisely a working length of 395 mm and a power rating of 1.250 kW, while each of the drying and calcining rods had a total length of 1925 mm, and more precisely a working length of 1670 mm, and a power rating of 2.4 kW. The total power that said rods could deliver was therefore 9.8 kW, sufficient for ensuring a temperature gradient in the drying zone from 250° C. to 500° C. and a temperature gradient in the calcining zone of 500° C. to 675° C.

Said oven was maintained at a negative pressure of about 500 Pa (50 mm of water column) below atmospheric pressure.

It was fed with 9.9 kg of (moist) plutonium oxalate per hour and therefore produced 4.5 kg of plutonium oxide per hour (corresponding to 4 kg of plutonium per hour, i.e. 96 kg of plutonium per day).

Said moist plutonium oxalate contained 30% by weight of water (total water=bonded water+interstitial water). Its apparent relative density was 0.6. It underwent the following reaction:

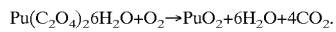

$$Pu(C_2O_4)_2 6H_2O + O_2 \rightarrow PuO_2 + 6H_2O + 4CO_2.$$

Oxygen was injected into said oven at a rate corresponding to twice the stoichiometric quantity.

200 normal liters per hour (Nl/h) of air was also injected via the rear bearing.

With reference to the gas filter assembly, the following can be stated. It was constituted by seven filter cartridges having a filter medium of sintered metal preferably sintered stainless steel, such as Poral® brand filter cartridges each having a height of 250 mm, a diameter of 30 mm and a filtering area of 300 cm.

Each of said cartridges was unclogged, in turn, about once every 15 minutes, once it had picked up about 12 grams of cake. The pulse of air delivered for unclogging purposes corresponded to 300 normal cubic centimeters (Ncm³) of air.

Said filter assembly filtered 7.8 normal cubic meters per hour (Nm³/h) of gas, corresponding to 5.6 Nm³/h of water vapor, of carbon dioxide and of excess oxygen+2.2 Nm³/h of ventilation gas (including the air injected via the rear bearing).

What is claimed is:

1. An apparatus for transforming plutonium oxalate into plutonium oxide by drying and then calcining, the apparatus being disposed in a glove box having at least one face, and comprising:

a generally cylindrical oven having an Archimedes screw mounted on a horizontal axis thereof, said screw being adapted to rotate about said horizontal axis, thereby transferring a heat-treated substance from a first zone of said oven where said substance is dried to a second zone of said oven where said substance is calcined; said oven including a body having:

a first opening for permitting the feeding of the oven with plutonium oxalate at one end of the oven, adjacent to the first zone;

a second opening for permitting emptying of the plutonium oxide from the oven at a second end of said oven, adjacent to the second zone;

a third opening for permitting the injection of oxygen into said oven; and a fourth opening for permitting the extraction of gas from said oven; the oven further having housings, each housing being disposed in the body of the oven and opening outwardly with respect to the glove box on the exterior of the glove box, for receiving heater rods, said heater rods comprising at least one first rod and at least one second rod, said heater rods capable of being regulated to define temperature conditions inside said oven that are suitable for implementing drying in said first zone and calcining in said second zone longitudinally in the direction of the horizontal axis of the oven; and said at least one first rod for performing part of the drying of plutonium oxalate in said first zone; and said at least one second rod longer than said first rod both for performing part of the drying of plutonium oxalate in said first zone and for performing the calcining of the dried plutonium oxalate in said second zone;

said first and second rods being accessible from said face of said glove box;

gas extraction means suitable for extracting gas from said fourth opening while keeping the oven at negative pressure; and a filter assembly including a set of parallel filtering cartridges for removing entrained dust present in any gas extracted through said fourth opening by said gas extraction means, each filtering cartridge containing an undeformable filter medium, and being coupled to a nozzle having a sonic throat for unclogging said filter medium, in situ.

2. The apparatus according to claim 1, wherein said fourth opening is provided in said first zone, downstream from the first opening in the direction of apparent movement of the Archimedes screw.

3. The apparatus according to claim 1, wherein said nozzle is associated with means for intermittently puffing a small pulse of gas through said filter medium.

4. The apparatus according to claim 3, further comprising a fast opening/closing solenoid valve coupled to said nozzle for controlling the passage of gas therethrough.

5. The apparatus according to claim 1, wherein said first opening is disposed in a top portion of said oven body;

said fourth opening is also provided in the top portion of said oven body, downstream from said first opening;

said second opening is provided in a bottom portion of said oven body; and said third opening is provided in the top portion of said oven body.

6. The apparatus according to claim 5, wherein said third opening has an axis which is co-axial with said second opening.

7. The apparatus of claim 1, further comprising:

a front bearing disposed in said one end of said body of said oven;

a rear bearing disposed in said second end of body of said oven, said Archimedes screw being disposed within said body to engage said front and rear bearings for rotational movement of said Archimedes screw therein, and said rear bearing being adapted to permit the injection of sweeping gas therethrough for cleaning said apparatus; and a driver for driving said Archimedes screw, said driver being disposed upstream from said front bearing.

8. The apparatus according to claim 7, wherein said driver is coupled to an assembly for detecting rotation of said Archimedes screw.

9. The apparatus according to claim 1, wherein said body of the oven is lagged in a thermal insulation assembly.

10. The apparatus according to claim 9, further comprising a case disposed about the thermal insulation assembly, the case being fitted with expansion-compensating bellows to permit expansion thereof.

* * * * *